United States Patent Office 3,788,988
Patented Jan. 29, 1974

3,788,988
LUBRICANT COMPOSITIONS FOR THE COLD
SHAPING OF METALS
Jean Dubourg, Sotteville-les-Rouen, France, assignor to
Rhone-Poulenc S.A., Paris, France
No Drawing. Filed Mar. 28, 1972, Ser. No. 238,953
Claims priority, application France, Mar. 29, 1971,
7110932
Int. Cl. C10m 1/36, 1/46
U.S. Cl. 252—32.5                                       11 Claims

ABSTRACT OF THE DISCLOSURE

A lubricating composition, suitable for cold working metals, comprise (i) an amide phosphate which is a reaction product of ortho-phosphoric acid or mono or di-ester thereof and an amide derived from an aliphatic carboxylic acid having at least 12 carbon atoms or a resin acid and a primary or secondary aliphatic amine and (ii) a surface active agent. The composition may be prepared in anhydrous form and emulsified in water prior to use or may be prepared as an aqueous emulsion.

---

The present invention relates to lubricant compositions which can be used for the cold shaping of ferrous or non-ferrous metals.

It is known to use aqueous or non-aqueous lubricant compositions in the cold shaping of metals, e.g. drawing, rolling and wire-drawing. In the aqueous compositions, various products such as alkali metal soaps, sulphonated oils, sulphonated derivatives of petroleum products, polyalkylene glycols, mineral, vegetable or animal oils, fatty acids and esters of various fatty acids are used, and these various products can be used as mixtures, generally together with various additives such as surface-active products, bactericides or anti-rust agents. In the non-aqueous compositions, pure mineral oils are used, or mineral oils improved by means of polar products such as fatty acids, esters of fatty acids, various additives such as polyglycols or polybutenes, natural triglycerides such as colza oil or monoglycerides such as glycerol monooleate and sulphur-containing, chlorinated, phosphorus-containing or mixed high pressure additives, and the like.

It is also known that certain amides show certain valuable lubricant properties which are, however, inadequate at the high pressure level. For this reason they cannot be used universally for all drawing, rolling or wire-drawing treatments.

We have now developed, in accordance with the present invention, new lubricant compositions which have a broad applicability and which show a higher efficiency than the compositions previously used.

The present invention provides a lubricating composition comprising: (a) an amide phosphate which is the reaction product of (i) phosphoric acid or a phosphate monoester or diester of the formula

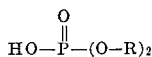

in which the symbol R represents hydrogen or a hydrocarbon radical or an organic radical of the formula:

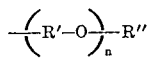

in which R' is a polymethylene radical and R" is a hydrocarbon radical or a substituted hydrocarbon radical and (ii) an amide derived from an aliphatic, saturated or unsaturated, carboxylic acid having at least 12 carbon atoms, or a resin acid, and a primary or secondary aliphatic monoamine or polyamine, and (b) a surface active agent.

As phosphate esters it is possible to use, for example, alkyl monoesters or diesters of ortho-phosphoric acid or monoesters or diesters obtained by reaction of orthophosphoric acid with the condensation products of an alkylene oxide with an alkylphenol.

The amides it is possible to use include those derived from acids such as lauric, palmitic, stearic or oleic acids and amines such as propylamine, isopropylamine, butylamines, ethylenediamine, diethylenetriamine or homologous aliphatic monoamines or polyamines, or alkanolamines such as monoethanolamine, diethanolamine or aminomethylpropanol.

The amide phosphate used in the compositions according to the invention may be obtained by gradual addition of ortho-phosphoric acid or the ortho-phosphoric acid ester to the corresponding amount of amide at a temperature which can be 20° to 150° C. and depends on the nature of the amide and is principally varied as a function of the fluidity conditions of the medium. The proportions are generally calculated on a group for group basis which means that one ionizable hydrogen atom in the phosphoric acid or mono- or di-ester thereof is required for each protonatable amide group in the amide molecule.

Any product which makes it possible to render the composition self-emulsifiable in water can be used as surface-active agent. In particular, it is possible to use alkali metal soaps, non-ionic surface-active agents or quaternary ammonium salts. The proportion of these surface-active agents can range from 5 to 30% of the weight of the amide phosphate.

The compositions according to the invention can contain one or more of the components indicated above.

In addition to the amide phosphate and the surface-active agent, the compositions according to the invention can contain supplementary lubricant substances such as mineral oils, fatty acids and esters of fatty acids, as well as various additives such as complex-forming agents and bactericides.

The compositions according to the invention can be in the form of self-emulsifiable anhydrous compositions. They can also be prepared in the form of aqueous emulsions containing varying proportions of amide phosphate and the pH can be adjusted to any desired value by means of sodium hydroxide or other neutralizing agents.

The compositions according to the invention have an extremely low coefficient of friction, compared to the previously used lubricant compositions, which makes it possible in cold working of metals either to use greater reduction ratios for each pass or higher work speeds. In experiments with the Amsler machine, using aqueous emulsions according to the invention of 2% solids content, it is possible to achieve coefficients of friction of the order of only 0.01 to 0.02, whilst with the compositions known hitherto the coefficients of friction are considerably higher under similar working conditions.

The compositions according to the invention are used in cold working of metals in the form of concentrated or dilute aqueous emulsions. The non-aqueous compositions must therefore be emulsified before use. The concentrated aqueous emulsions, which are in the form of pastes, can be used for drawing copper tubes over a short mandrel, for drawing steel bars and for wire-drawing of descaled steel in one or two passes. In a more dilute form, for example at 2 or 3% solids content, they can be used for drawing bars, rolling sheets or drawing wires, these operations being applicable to both ferrous and non-ferrous metals.

The examples which follow illustrate the lubricant compositions according to the invention and their use.

EXAMPLE 1

Composition in the form of a soft grease:

| | Percent |
|---|---|
| Reaction product of (1) ortho-phosphate ester of an ethylene oxide/octylphenol adduct, acid number 105, with (2) the amide derived from tallow fatty acids and bis-hexamethylenetriamine [NH$_2$(CH$_2$)$_6$]$_2$NH | 30 |
| Condensate of 9–10 moles ethylene oxide with one mole of the amine derived from tallow fatty acids (C$_{16}$–C$_{18}$) | 3 |
| Water | 67 |

This composition, used as such, is suitable for the mandrel drawing of copper tubes.

EXAMPLE 2

| | Percent |
|---|---|
| Reaction product of (1) ortho-phosphoric acid with (2) the amide derived from oleic acid and diethanolamine | 30 |
| Ethylene oxide/tallow fatty acid amine condensate as described in Example 1 | 4 |
| Water | 66 |

When used as a 10% strength aqueous dispersion for re-drawing galvanized mild steel wires at high speed, the product gives remarkable lubrication and results in very glossy surface conditions.

I claim:

1. A water emulsifiable lubricating composition comprising: a mixture of (a) lubricating amounts of a salt of (i) a phosphoric acid of the formula

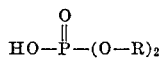

in which the symbol R represents hydrogen or a hydrocarbon radical or an organic radical of the formula:

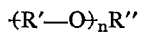

in which R' is a polymethylene radical and R" is a hydrocarbon radical and $n$ is a positive number and (ii) an amide derived from an aliphatic, saturated or unsaturated carboxylic acid having at least 12 carbon atoms, or a rosin acid, and a primary or secondary aliphatic monoamine or polyamine, and (b) emulsifying amounts of a surface active agent.

2. A composition according to claim 1 in substantially anhydrous form.

3. A composition according to claim 1 containing 5–30% by weight of surface active agent based on the weight of said salt.

4. A composition according to claim 1 wherein the said salt is a reaction product of the amide with ortho-phosphoric acid or with a reaction product of an ortho-phosphate ester with an octylphenol/ethylene oxide adduct.

5. A composition according to claim 1 wherein the said salt is a reaction product of the phosphoric acid or phosphate ester with an amide derived from oleic acid and diethanolamine or an amide derived from tallow fatty acids and bis-hexamethylene triamine.

6. A method of cold shaping ferrous or nonferrous metals which comprises applying to the metal as a lubricant a composition according to claim 1 and then cold working the metal.

7. A composition according to claim 1 wherein, in the phosphoric acid, R represents a hydrocarbon radical or an organic radical of the formula —(R'—O—)$_n$R" and the amide is derived from polyamine.

8. A composition according to claim 1 which additionally comprises at least one additive selected from the group consisting of mineral oil, fatty acids, esters of fatty acids and bactericides.

9. A composition according to claim 1 wherein the salt is a salt of
(i) a phosphoric acid of the formula

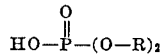

in which the symbol R represents hydrogen or the esterified residue of the condensation product of ethylene oxide with an alkyl phenol and
(ii) an amide derived from an alkanoic or alkenoic acid having 12 to 18 carbon atoms with a primary or secondary aliphatic monoamine or polyamine.

10. A modification of the composition according to claim 1 wherein the composition is in the form of an aqueous emulsion.

11. A composition according to claim 10 in the form of a soft grease aqueous emulsion containing 30–35% by weight solids and wherein the said salt is (1) a reaction product of an ortho-phosphate ester of an ethyleneoxide/octyl-phenol adduct and an amide derived from tallow fatty acids and bis-hexamethylenetriamine or (2) a reaction product of ortho-phosphoric acid and oleic acid diethanolamide.

References Cited
UNITED STATES PATENTS

| | | | |
|---|---|---|---|
| 2,968,629 | 1/1961 | Thompson | 252—32.5 X |
| 2,989,464 | 6/1961 | Panzer | 252—32.5 |
| 3,056,744 | 10/1962 | Copes et al. | 252—49.5 X |
| 2,548,156 | 4/1951 | Gresham et al. | 260—534 X |
| 3,203,895 | 8/1965 | Latos et al. | 252—32.5 |
| 3,531,411 | 9/1970 | Benson et al. | 252—49.3 X |

DANIEL E. WYMAN, Primary Examiner

W. H. CANNON, Assistant Examiner

U.S. Cl. X.R.

252—49.3, 49.5, 49.9; 260—561 P, 925